J. B. Summerill.
Hay-Elevator.
No. 75810. Patented Mar. 24, 1868.
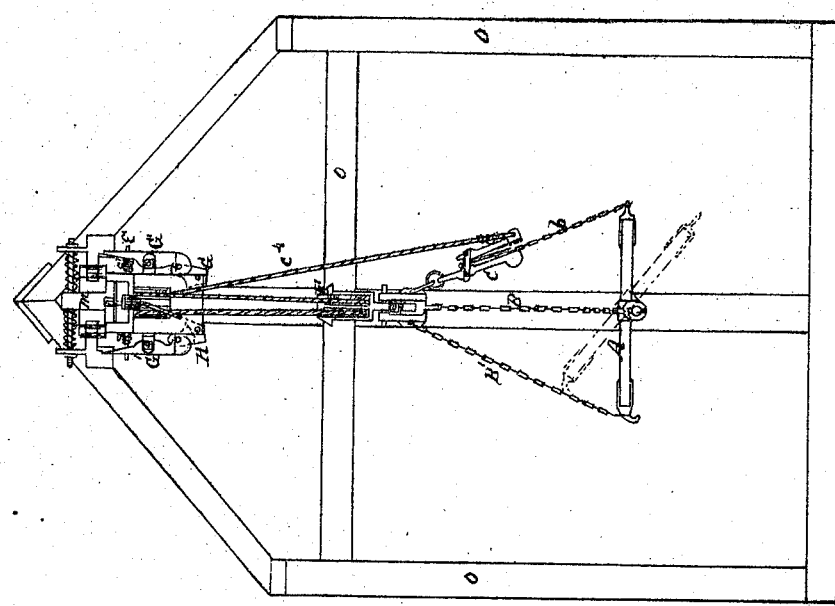
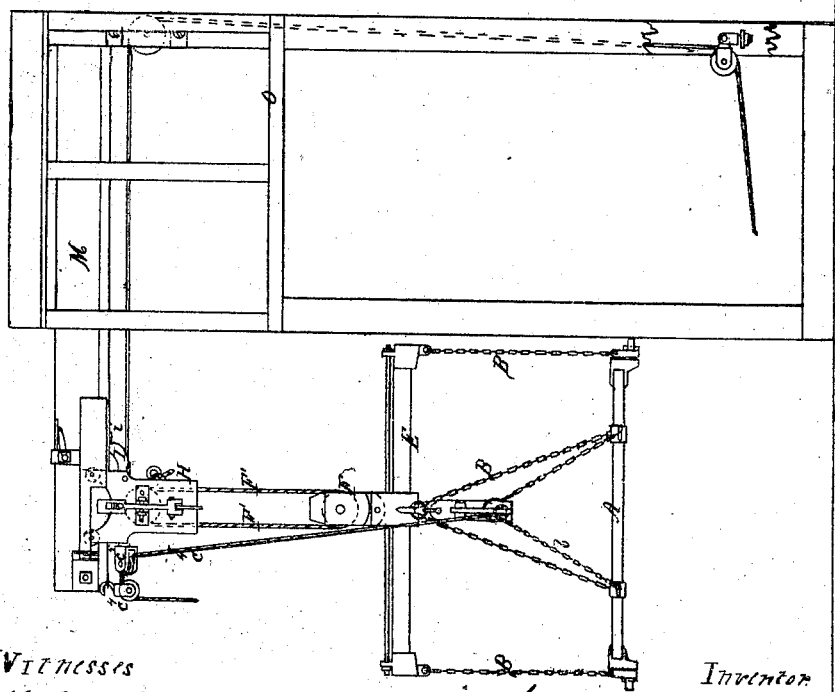
Witnesses
Inventor
James B. Summerill

J. B. Summerill
Hay-Elevator

N° 75810

Patented Mar. 24, 1868.

2 Sheets
Sheet 2

Witnesses

Inventor
James B. Summerill

United States Patent Office.

JAMES B. SUMMERILL, OF PENN'S GROVE, NEW JERSEY.

Letters Patent No. 75,810, dated March 24, 1868.

IMPROVEMENT IN HAY-ELEVATOR.

*The Schedule referred to in these Letters Patent and making part of the same.*

TO ALL WHOM IT MAY CONCERN:

Be it known that I, JAMES B. SUMMERILL, of Penn's Grove, in the county of Salem, and State of New Jersey, have invented a new and useful Improvement in Apparatus for Elevating and Discharging Hay and other articles, of which the following is a full, clear, and exact description, reference being had to the accompanying drawings, which make part of this specification, and in which—

Figure 1 represents a side elevation of my improved apparatus, and

Figure 2 a front view of the same.

Figure 7 shows the same when tripped.

It is the object of my invention to hoist an entire wagon-load of hay at once, and discharge it into a barn or upon a mow; and my improvement consists in certain novel devices for accomplishing this result, which devices are hereinafter described.

To carry out my invention in the most perfect manner, I construct (as shown in the accompanying drawings) a barn, O, (of which the drawings show the frame only,) with a lofty roof, underneath which a stout beam, M, is secured. Flanges $m$ project on each side of the bottom of this beam, and form a trainway, on which a travelling-frame, H, traverses on rollers $h$. A holding-spring catch, N, is pivoted to an arm, $n$, projecting from each side of the beam M, in such manner as to play horizontally on its pivots. These catches move on guide-rods or braces $n^1$, and are pressed out from the beam by coiled springs $n^2$ on the rods. When drawn out to its full extent, the travelling-frame H abuts against the arms $n$, which thus act as stops to prevent its moving farther. As it is important in loading to have the travelling-frame steady, a balance-lever or dog, I, is pivoted to play vertically in the top of the travelling-frame. The back end of this lever is heavier than its front, so that, when the frame is run out, the nose rises and rests against a stop, $i$, on the under side of the beam, and thus prevents the frame from moving backward until the dog is thrown out. This is done at the proper time by a pin, I', which plays vertically in the travelling-frame, and strikes against the rear end of the lever, which it lifts, thus releasing the front end from the stop, and leaving the frame free to move, as hereinafter explained.

Rocking-catches or blocks G are pivoted to vibrate vertically through slots in each side of the traversing-frame. These blocks are pivoted to tripping-levers G', also pivoted to play vertically on the frame. Coiled springs $g$ on rods $g'$ keep the upper ends of these levers thrown out, and the toes of the catches G correspondingly pressed in. These catches are made flat on top to hold corresponding edges $f$ on the lifting-block F, which is connected with the travelling-frame by a rope, F', encircling pulleys $h'$ in the travelling-frame, and corresponding pulleys $f''$ in the block.

Figure 6:
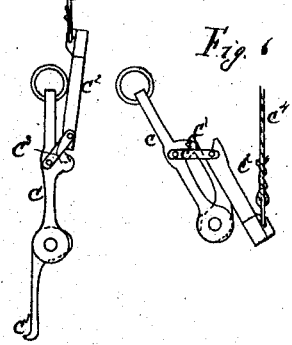
Figure 6 shows the tripping or detaching-device locked as in hoisting.

A beam, E, is pivoted to the lifting-block, and provided at each end with a hoisting-chain, B, having loops or eyes at their lower ends, in which the journals of the hoisting-frame A are inserted. These journals are placed centrally in each end of the frame to balance it properly. To avoid tipping the frame at the wrong time, cords or chains B' connect the back of the frame with the beam E, while a similar chain, $b$, attached to the other side of the frame, is connected with a tripping-catch, C, (see figs. 6 and 7.) This catch consists of a shank, $c$, having a hook, $c^1$, pivoted to play vertically in its lower end. A detacher, $c^2$, is pivoted at its upper end, by a link, $c^3$, to the shank, and is operated by a cord, $c^4$, passing over a pulley, $c^5$, in the travelling-frame, and a corresponding pulley, $c^6$, on the beam M.

Figure 4:
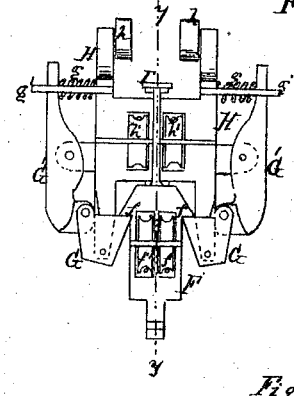
Figure 4 represents a transverse vertical section through the same at the line $x\,x$ of fig. 3.
Figure 5:
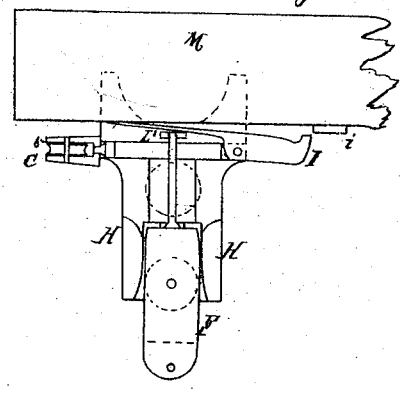
Figure 5 represents a vertical longitudinal section through the same at the line $y\,y$ of fig. 4.
Figure 3:
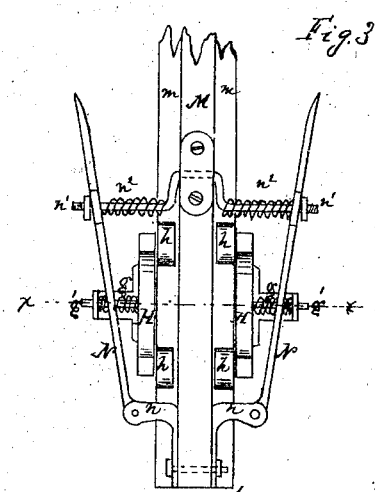
Figure 3 represents a plan or top view of the carrying, holding, and tripping-devices.

The operation is as follows: The frame or shelving A is placed on the body of the wagon, or may, in fact, itself form that body. The hay, having been loaded in any well-known way, is hauled to the barn. The wagon is driven under the travelling-frame, which has been run out to the extremity of the beam M. The chains B are then hooked on the pivots $a$, and the back chain B' also attached. The front chain $b$ is then locked in the latch C. Power is now applied to the rope F', and the load hoisted until the block F strikes against the pin I', as shown in figs. 3 and 4. The inclined sides of the head of the block force the blocks G apart, and compress their springs, which close them again behind the block as soon as it has passed, and thus lock the block in the travelling-frame H. At the same time the pin I' strikes the dog I and releases the catch which holds the travelling-frame. The continued pull on the rope F' then draws the load into the barn; the traversing-frame running on its trainway. As the frame runs in, the catch-levers G' rub against the outer side of the spring-guides N, and thus prevent any accidental detachment of the lifting-block from its catches G. At the proper moment, the attendant pulls the tripping-cord $c^4$, which releases the catch $e$ and chain $b$, and allows the frame to tip and dump its load. The continued pull on the tripping-cord then runs out the frame again. As it goes out, the catch-levers G' pass inside the spring-guides N, which compress them, and thus retract the block G, and release the lifting-block, which descends by its own weight, and lowers the frame A upon the wagon. The apparatus is now ready to repeat the above-described operation.

The beam B is pivoted to the hoisting-block by a pin, which can be removed to allow the frame to be reversed, and thus dump the load on any side desired. By twisting the ropes, the frame would revolve of itself, when hoisted, until it reached the desired point of discharge. By making the blocks and frame square, they prevent the load from turning after it is locked, and the load can thus be run close under the roof without striking. The outer end of the beam M must, of course, be properly braced or supported to resist any strain to which it may be subjected. It will thus be seen that, by my improved apparatus, much time and trouble can be saved as compared with the ordinary method of unloading.

It is obvious that the team which hauls the load could also be used to hoist it, or that a capstan might be used where heavy loads are to be lifted. It is also obvious that other articles might be hoisted and discharged by my apparatus as well as hay.

What I claim as my invention, and desire to secure by Letters Patent, is—

1. The hoisting-frame A, constructed and arranged as and for the purpose described.

2. The tripping-catch C, constructed as described.

3. The combination, substantially as described, of the hoisting-frame A, the suspension-frame B, and the tripping-catch, for the purpose set forth.

4. The traversing-frame H, arranged and operating substantially as described.

5. The combination, as described, with the traversing-frame and supporting-beam, of the locking-dog I, for the purpose set forth.

6. The combination, substantially as described, of the hoisting-block and traversing-frame, with the locking-catches G, for the purpose specified.

7. The combination, with the traversing-frame and catches G', of the spring-guides N on the beam, for the purpose set forth.

8. The combination, with the locking-dog I, of the lifter I', arranged to be operated by the ascent of the block, as described.

9. The combination, substantially as described, of the hoisting-block and traversing-frame, with a rope connecting the two, and so arranged as to lift the block vertically and lock it in the traversing-frame, and then to unlock the frame and traverse it horizontally to the place of discharge, by a continuous pull on the same rope.

10. The tripping-rope, arranged so as to dump the hoisting-frame, and then to retract the traversing-frame, by a continuous pull, in the manner described.

In testimony whereof, I have hereunto subscribed my name.

JAMES B. SUMMERILL.

Witnesses:
    EDM. F. BROWN,
    J. I. PEYTON.